Patented Sept. 11, 1951

2,567,646

UNITED STATES PATENT OFFICE 2,567,646

LOW-TEMPERATURE SEPARATION OF OIL FROM WAX INVOLVING INITIAL CHILLING IN A FILM-TYPE CHILLER

Jack L. Little, Port Arthur, Tex., assignor to The Texas Company, New York, N. Y., a corporation of Delaware No Drawing. Application June 2, 1949, Serial No. 96,824

2 Claims. (Cl. 196—18)

This invention relates to low temperature separation of oil from wax involving initial chilling in the substantial absence of solvent to form a solidified film or relatively thin layer of solidified oil-wax mixture. The solidified mixture is subsequently commingled with cold dewaxing solvent liquid and subjected to filtration or other means effective to separate crystallized wax therefrom.

The invention contemplates cooling an oil-wax feed to a temperature, either near the dewaxing temperature or just above its pour temperature and passing a refrigerated metallic surface in contact with the cool feed mixture under conditions such that a relatively thin layer of solidified oil-wax mixture is deposited thereon. The oil and wax-bearing surface is removed from contact with the cool feed mixture and the resulting layer of solidified oil and wax is discharged therefrom. This discharged material is thereafter commingled with relatively cool or chilled dewaxing solvent liquid and the resulting mixture with or without further chilling subjected to filtration under conditions adapted to remove the crystallized wax from the solution of oil in solvent liquid.

It has been proposed heretofore in the dewaxing of wax-bearing mineral oil to effect initial chilling of the wax-bearing oil in the absence, or substantial absence of solvent liquid, and thereafter subject the cold wax-bearing oil in the presence of the solvent liquid to filtration. It has been disclosed, for example, in U. S. Patent 2,229,658 granted to Vance N. Jenkins. As indicated in this patent, crystallization of the wax from the wax-oil mixture in the absence of solvent liquid or in the presence of a limited amount of solvent is advantageous with respect to securing a wax structure of desirable type.

However, the conventional methods of chilling involve flow of a stream of wax-bearing liquid through tubular chilling equipment or chilling in jacketed vessels such as disclosed in the aforesaid patent. With this type of chilling equipment there is a definite limiting temperature to which the wax-bearing oil may be reduced in the absence of solvent liquid, otherwise plugging occurs or else the pressure drop through the chilling system becomes excessive. To overcome these difficulties heretofore, resort has been had to addition of small amounts of solvent liquid to the mixture undergoing chilling so as to maintain the mixture in a sufficiently fluid state to flow through the chilling equipment without plugging or without excessive pressure drop. Nevertheless, in the case of dewaxing at 0° F. wax-bearing distillates of about 80 to 135 Saybolt Universal seconds viscosity at 100° F., improved yields and filter cycle rates result when even smaller portions of the solvent are added during the early stages of chilling, for example, at about 70° F., and a larger portion added at 0° F. However the resulting low dilution in the early stages causes excessive pressure drops in the conventional double pipe chilling equipment.

The present invention concerns a novel method of effecting the initial chilling and crystallization of the wax without the necessity for adding any solvent liquid thereby securing a further and substantial improvement in the dewaxing operation. This novel method of chilling involves maintaining a body of the wax-bearing oil feed in the absence of solvent liquid at a temperature just above its pour point. A refrigerated metal cylinder or drum is rotatably supported with partial submergence in the aforesaid body of wax-bearing oil. The cylinder is rotated horizontally about its axis after the manner of a rotary drum filter. A refrigerating medium is caused to flow within the interior of the cylinder so as to maintain the submerged surface thereof at a temperature sufficiently low so that upon contact between the metal surface and oil-wax mixture solidification of the oil and wax occurs forming a relatively thin layer or film upon the exterior surface of the cylinder.

Cold brine may be circulated through the cylinder or if desired, chilling of the cylinder may be effected by direct expansion of ammonia in the interior thereof. The inlet and outlet connections for the refrigerant or brine can be made through hollow trunnions supporting the drum. Advantageously, the cylinder or drum may be of hollow wall construction with provision for circulating the brine or refrigerant through the hollow wall and thus reduce the volume otherwise necessary while at the same time increasing the velocity of brine flow, thereby improving the rate of heat transfer.

The cylinder may, for example, have a diameter of 5 feet or more and a length of 8 feet or more depending upon the desired capacity. The depth of submergence may be up to about 135 degrees of the circumference of the cylinder. The actual depth can be adjusted as desired. Likewise the speed of rotation, temperature of the drum and of the oil may be varied. For example, conditions may be adjusted so as to secure a solid film or cake of about ⅛ inch thickness upon the surface of the drum.

A high rate of heat transfer can be obtained so that the oil-wax film leaves the immediate vicinity of the drum at not more than 20 or 30° F. higher than the temperature of the metal surface of the drum.

The actual temperature of the discharged film may be as low as —20° F. or as high as +70° F. depending on the stocks being processed and the ultimate pour test desired.

This layer or film of solidified oil and wax remains upon the metal surface as it emerges from the body of cool wax-bearing oil. This solidified layer can be scraped from the emergent metal surface in substantially the same manner as a filter cake is scraped from a rotary drum filter. Instead of scraping, other means may be used for effecting removal of the layer of solidified material from the metal surface. For example, it can be removed by the action of high pressure streams or jets of cool solvent liquid.

The cylinder surface, of course, is impervious in contrast with the filter surface of a rotary drum filter, all of the wax-bearing oil feed being converted to solid film form.

The discharged solidified oil and wax are commingled with cold dewaxing solvent liquid. This solvent liquid may be the conventional type of dewaxing solvent or solvent mixture. For example, suitable dewaxing solvents comprise aliphatic ketones, mixtures thereof, mixtures of ketone and aromatic hydrocarbons such as a mixture of methylethyl ketone and either benzol, toluol or mixtures of benzol and toluol. Other wax anti-solvents besides ketones may be employed, examples of which are aldehydes, phenols, amines, nitrobenzene, sulfur dioxide, etc. Other oil solvents besides aromatic hydrocarbons may be used and it is also contemplated that hydrocarbon solvent liquids such as liquefied normally gaseous petroleum hydrocarbons namely, propane, butane, or mixtures thereof, etc., may be used.

The solvent liquid or solvent liquid mixture is advantageously prechilled to about the temperature of the solidified oil-wax mixture with which it is being commingled. Thus, the layer of solidified oil and wax discharged from the aforedescribed film-type chiller may be at a temperature in the range plus 30 to 0° F. or even lower, and, therefore, the solvent liquid is separately chilled to such temperature prior to commingling with the solidified oil-wax mixture. The prechilled solvent may be employed in the proportion of about 3 to 4 volumes of solvent or solvent liquid mixture per volume of solidified oil-wax mixture. It is desirable to employ a solvent of such composition and of such dosage that it will effect solution of the oil contained in the solidified mixture scraped from the drum, leaving the wax in crystal form effective for efficient separation from the resulting solution of oil in solvent by filtration.

The resulting mixture of wax and oil solution may be subjected to further chilling if desired as for example, chilling to a temperature in the range 0 to minus 20° F. or even lower. The resulting chilled mixture is then passed to a continuous rotary drum filter such as employed in conventional solvent dewaxing operations at low temperatures. The crystallized wax is separated from the mixture forming a filter cake of wax and producing a filtrate of dewaxed oil dissolved in solvent liquid.

As conventionally practiced the filter cake is subjected to washing with additional solvent liquid in situ to remove retained oil and the resulting washed cake after drying in the filter is discharged therefrom.

The discharged wax cake and the resulting filtrate are separately treated to recover the solvent liquid therefrom. The solvent free oil may have a pour test in the range of 0 to minus 20° F. or not materially higher than the filtering temperature. The recovered wax is characterized by having a relatively low oil content of a fraction of a per cent or so.

An important advantage of the process of this invention is that it eliminates the use of the conventional double pipe scraped wall chillers at least in the initial chilling step. The solvent liquid can be prechilled in efficiently designed chilling equipment prior to mixing with the oil and wax.

Furthermore, the invention provides a means for cooling relatively viscous oils and oils of relatively high wax content to approximately the dewaxing temperature, i. e., 0° F. and below, in the complete absence of solvent and thereby permit securing the maximum benefit with respect to improved crystal structure of the wax. As a result the wax is more effectively filtered from the oil and solvent in the subsequent stage of the process and a wax product of lower oil content is obtained.

The reduction in oil content of the slack wax product is indicated by the following comparative data involving the dewaxing of a lubricating oil distillate derived from Texas crude and having a Saybolt Universal viscosity of about 52.4 seconds at 210° F., having a pour test of about 110° F. and containing about 17% wax of 135 melting point. A distillate lubricating oil stock of this character requires partial dilution with some solvent liquid where chilling is carried out in the conventional double pipe chilling equipment. Thus, the distillate is mixed with about one volume of solvent per volume of distillate at 130° F. and chilled to about plus 5° F. Additional prechilled solvent liquid at about plus 5° F. is added to the cold mixture in the proportion of about one volume of solvent to one volume of solvent-free feed mixture. This final mixture is chilled to about 0° F. and filtered in a continuous rotary drum vacuum filter operation producing a wax cake which still retains about 10 to 15% oil. The dewaxed oil yield obtained from the filtrate amounts to about 83% by volume of the feed distillate.

On the other hand, when this same distillate is chilled to plus 80° F. in the complete absence of solvent liquid and then one volume of solvent precooled to 80° F. is added per volume of distillate, the resulting mixture chilled to plus 5° F. and then commingled with another volume of solvent at plus 5° F. followed by final chilling to 0° F. and filtration under the same conditions as before, the resulting wax cake contains only about 3 to 5% oil while the yield of dewaxed oil is about 84.5%. Moreover, the filter rate in the second instance may be as much as 25% faster than that secured in the first instance.

By initially chilling the distillate in the absence of solvent liquid to about the dewaxing or filtering temperature, employing the procedure of the present invention, the final filter cake of wax will retain still less oil and a yield of dewaxed oil will be correspondingly higher.

Although specific mention has been made of the aforesaid lubricating oil distillate nevertheless it is contemplated that the process may be applied to wax distillates of either less viscous or more viscous character. It may also be applied to residual stocks as well as to the separation of oil from wax concentrates and may have application to the treatment of oils derived from other than mineral sources.

Obviously many modifications and variations of the invention, as hereinbefore set forth, may be made without departing from the spirit and scope thereof, and therefore, only such limitations should be imposed as are indicated in the appended claims.

I claim:

1. In the separation of wax from wax-bearing lubricating oil stock involving chilling to crystallize wax therefrom and separation of the crystallized wax from the oil in the presence of dewaxing solvent liquid by continuous filtration at low temperature, the method comprising cooling the oil in the substantial absence of solvent liquid to a temperature just above its ASTM pour point, passing a chilled metallic surface in contact with said cooled oil wax feed such that solidified oil and wax is deposited thereon in the form of a relatively thin layer, removing the oil and wax-bearing surface from contact with cool feed, discharging resulting solidified layer at a dewaxing temperature in the range of about 0° F. and below from the removed surface, commingling the discharged layer with cool dewaxing solvent liquid in amounts sufficient to dissolve oil constituents thereof and form a filtrable mixture, subjecting the resulting commingled mixture to filtration at substantially said dewaxing temperature and producing therefrom dewaxed oil and wax substantially free from oil.

2. The method of separating solidifiable constituents from oil containing both normally solid and normally liquid constituents, which comprises passing a chilled metallic surface in contact with said feed oil in the substantial absence of a solvent liquid, said surface while in contact with feed oil being maintained at a temperature sufficiently low so that a solid layer of feed oil at a dewaxing temperature in the range of about 0° F. and below forms thereon, removing resulting layer-bearing surface from contact with feed oil, discharging said cold layer from the removed surface, commingling cold solvent liquid with the cold discharged layer in amounts sufficient to dissolve normally liquid constituents of the feed oil and separating the resulting solution from remaining normally solid constituents of the oil at substantially said dewaxing temperature to produce dewaxed oil of low pour test.

JACK L. LITTLE.

REFERENCES CITED

The following references are of record in the file of this patent:

UNITED STATES PATENTS

| Number | Name | Date |
| --- | --- | --- |
| 308,593 | Cowing | Dec. 2, 1884 |
| 316,058 | Prentiss | Apr. 21, 1885 |
| 2,229,658 | Jenkins | Jan. 28, 1941 |
| 2,463,845 | Backlund et al. | Mar. 8, 1949 |